Nov. 30, 1937.  F. E. WARD  2,100,367
ELECTRIC DISCHARGE DEVICE
Filed June 16, 1932  2 Sheets-Sheet 1

INVENTOR
F. E. WARD
BY
Walter C. Kiesel
ATTORNEY

Nov. 30, 1937.  F. E. WARD  2,100,367
ELECTRIC DISCHARGE DEVICE
Filed June 16, 1932    2 Sheets-Sheet 2

INVENTOR
F. E. WARD
BY
Walter C. Kiesel
ATTORNEY

Patented Nov. 30, 1937

2,100,367

UNITED STATES PATENT OFFICE 2,100,367

ELECTRIC DISCHARGE DEVICE

Frank E. Ward, Williston Park, N. Y., assignor to Bell Telephone Laboratories, Incorporated, New York, N. Y., a corporation of New York Application June 16, 1932, Serial No. 617,491

7 Claims. (Cl. 250—27.5)

This invention relates to electric discharge devices and more particularly to such devices employing a cathode of the oxide type as an emitting source of electrons.

In discharge devices during operation, some of the active material vaporizes or flakes off the cathode and may be deposited on the glass stem in which the leading-in wires for the electrodes are sealed, or may be deposited on an insulating support to which the electrodes are affixed which is separate from the stem. Usually the wires are close together in the stem or support and are liable to be shorted by the formation of a leakage path along the stem or insulating support, due to the deposited active material from the cathode forming a conductive path between the wires. The formation of a leakage path may disrupt the operation of the device and render it useless. Consequently, any deterrent employed to overcome the formation of these leakage paths between the leading-in wires will facilitate the continued operation of the device and, therefore, obtain the maximum usefulness of the device in operation.

An object of this invention is to prevent the formation of a leakage path between the metallic supporting members of electrodes, due to active material from the cathode being deposited on the insulating support in which the supporting members are held.

Another object of the invention is to convert active materials thrown off the cathode and deposited on the insulating support into inactive non-conducting compounds.

In accordance with this invention the establishment of a conducting path along the stem or insulating member is avoided by covering the stem or insulating member with a coating or a mass of a non-conducting metallic oxide, such as an amphoteric oxide. The metallic oxides preferably employed for this purpose are oxides of nickel, chromium, aluminum and manganese. All of these oxides are non-conducting in nature and form an efficient insulator between the supports of the electrodes or the leading-in wires. Furthermore, these metallic oxides chemically combine with the active oxides of the cathode to form inactive compounds which are also non-conducting. The conversion of the active oxides falling off the cathode is instantaneous upon contact with the metallic oxides on the stem or support so that the insulation resistance between the supporting wires of the electrodes is always a maximum.

A feature of the invention relates to the formation of a well or trough above the sealed joints of the leading-in wires and the stem to serve as a receptacle for the converting substance.

Another feature of the invention relates to forming the converting substance into a layer or solid mass on an insulator or around the leading-in wires. The layer or mass of non-conducting metallic oxides situated on the glass stem or insulator, presents a roughened surface to the active materials thrown off the cathode and consequently serves as a hindrance to the establishment of a continuous conductive path between the supporting wires of the electrodes.

These and other features of the invention will be more clearly understood from the following detailed description taken in connection with the accompanying drawings in which.

Figure 1:
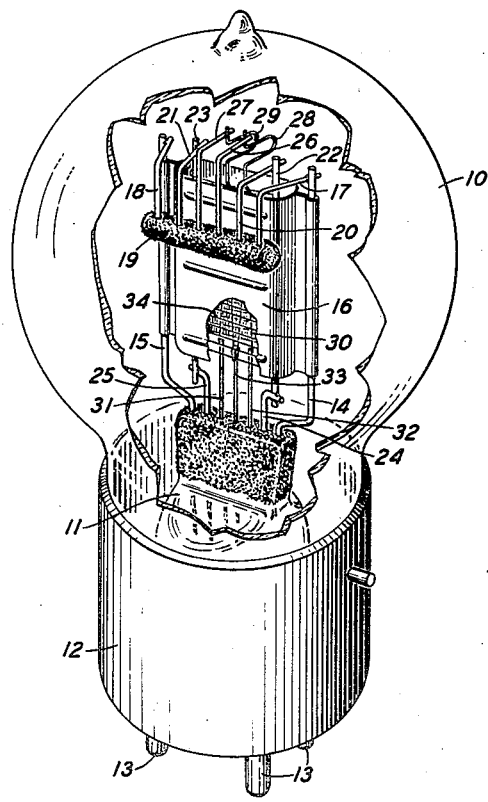
Fig. 1 is a perspective view of an electric discharge device made in accordance with this invention with a portion of the enclosing vessel broken away to more clearly show the electrode assembly and the insulating supports for the electrodes to which this invention is applicable.

Referring particularly to Fig. 1 of the drawings, a device of this invention comprises an enclosing vessel 10 having an inwardly projecting stem or press 11 in which the leading-in wires for the electrodes are sealed. The vessel is also provided with a cup-shaped insulating base 12 carrying a plurality of terminal prongs 13 for connecting the various electrodes to an external circuit. The glass stem or press 11 supports two upright wires 14 and 15 which support a flattened cylindrical metallic anode 16 which is provided with flanged portions embracing the upright wires 14 and 15. Attached to the extreme ends of the wires 14 and 15 are bent rods 17 and 18 which carry an elongated glass member or insulating bead 19. The insulating bead 19 carries a plurality of spaced wires which are embedded therein and these wires support associated electrodes situated within the anode 16. The wires 20 and 21 in the bead 19 are attached to the adjacent ends of longitudinal support rods 22 and 23 while the lower ends of the support rods 22 and 23 are attached to short wires 24 and 25 sealed in the press 11. The remaining wires 26 and 27 projecting from the insulating bead 19 carry resilient spring members 28 and 29, respectively, which support the bights of a filament, cathode or electron emitter 30, the ends of the filament 30 being connected to leading-in wires 31 and 32 embedded in the press and the center point of the filament being anchored to the stem by a wire hook 33. The filament or cathode is usually formed of a core material, such as platinum or platinum alloy, coated, or having combined therewith thermionically active material, such as barium and strontium oxides. The cathode 30 is situated in a plane along the axis of the anode 16 and is surrounded by a wire helical grid 34 which is supported by the upright rods 22 and 23, the grid being equally spaced from the cathode and anode surfaces.

In the operation of the device the high temperature necessary to effect a copious supply of electrons from the cathode causes the thermionically active material to vaporize and sometimes flake off the cathode and usually this material is deposited on the glass stem 11 or is projected through the top of the anode and may be deposited on the insulating bead 19. Since one of the functions of the glass stem and the insulating bead is to maintain an insulating path between the several supporting wires embedded therein, it is readily seen that continual deposition of thermionically active material on the stem or insulating bead will eventually form a conducting path between the support wires and impair the operation of the device, cause burning out of the filament, or render the device useless, due to a short-circuit being established between the electrodes. In order to overcome the establishment of conductive paths between the supports or leading-in wires in the insulating bead or glass stem these members are coated or painted with an amphoteric material or substance. Some materials having amphoterous characteristics are compounds of nickel, chromium, aluminum and manganese, such as nickel oxide NiO, chromium oxide $CrO_2$, aluminum oxide $Al_2O_3$ and manganese oxide $MnO_2$. These materials may be applied in the form of compounds or oxides together with a suitable binder such as cellulose nitrate dissolved in amyl acetate, or the materials may be applied in the form of metal powder mixed with the binder and later oxidized by the application of heat to change the metal into an insulating oxide and the binder material removed in the form of vapor.

These metallic oxides, which in themselves have insulating properties, insure adequate insulation resistance between the adjacent supporting wires in the glass bead 19 and stem 11, and serve as converting substances for any basic material thrown off the cathode and deposited on the bead or stem, whereby instantaneous conversion of the basic material to a stable insulating compound is performed. The term "amphoteric" is applied to the above mentioned materials or substances since they assume both acid and alkaline characteristics. For instance, if the cathode 30 is coated with alkaline earth oxides, such as barium and strontium oxides, and these basic oxides are thrown off the incandescent filament during the operation of the device and are deposited on the insulating coating on the stem or insulating bead, the basic oxides are converted to stable insulating compounds, such as barium and strontium, which might be expressed as $BaNiO_4$ and $SrNiO_4$ nickelite when the conversion coating is composed of nickel oxide. Similar coversion takes place when the insulating coating consists of chromium, aluminum or manganese oxides, but in these instances the compounds formed are chromates, aluminates, or manganates, respectively. Conversion takes place when other materials are used as the electron emitting substance coated on or combined with the filamentary core of the cathode. The product formed by the combination of the basic oxide and the insulating oxide is an inactive non-conducting stable compound which insures the maintenance of an adequate insulation resistance between the leading-in wires which are closely embedded in the stem or other insulating support of a discharge device.

Figure 2:
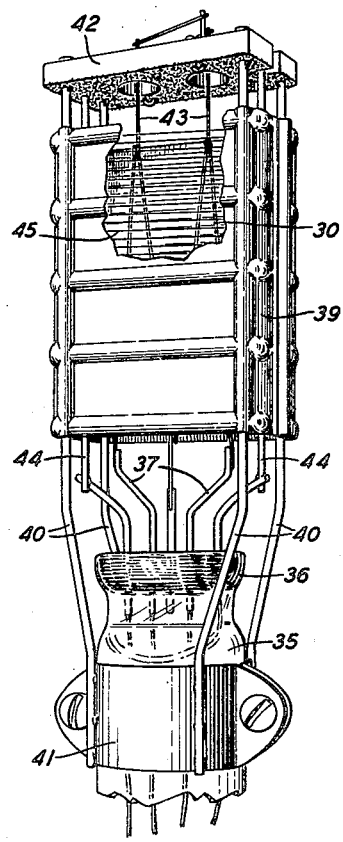
Fig. 2 shows in perspective another embodiment of the invention illustrating an electrode assembly supported on a stem with the enclosing vessel removed.
Figure 3:
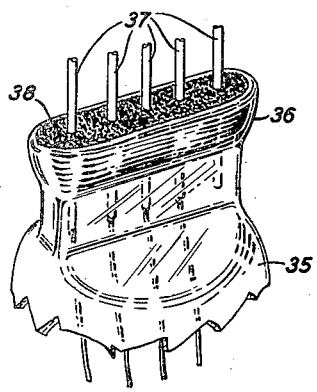
Fig. 3 is a perspective view of the glass stem made in accordance with this invention and embodied in the device of Fig. 2 illustrating particularly the leading-in wires for the electrodes embedded in a mass of metallic oxides held in a trough formed on the glass stem.
Figure 4:
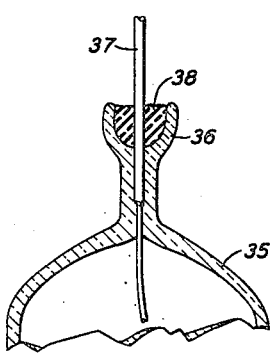
Fig. 4 is a cross-sectional view of the stem shown in Fig. 3.

In Fig. 2 is shown another type of discharge device to which the invention is applicable, but in this device the glass stem supporting the leading-in wires is treated differently. The stem 35 is formed with an open-topped receptacle or trough 36 as shown more clearly in Figs. 3 and 4. This trough forms a well around the leading-in wires 37 where they are exposed to any material thrown off the cathode 30 and therefore are liable to be shorted by the formation of a conducting path between the leading-in wires. The well or trough 36 is filled with a mass of the amphoteric substance 38 which reaches to the top lip thereof and presents a roughened surface which further increases the insulation between adjacent electrode supports or leading-in wires. The electrodes in the device, as shown in Fig. 2, include a rectangular-shaped box anode 39 which is supported by four upright rods 40 rigidly fastened to a metallic collar 41 embracing the stem 35. Supported on the extreme ends of the upright rods 40 is an insulating block or plate 42 which extends across the open end of the anode 39 and serves as a support for a pair of hooks 43 which extend through openings in the block 42 to support the bights of the filament 30. The ends of the filament 30 are connected to three central wires 37, two of which serve as leading-in wires. The remaining wires 37 extending through the trough 36 support upright rods 44 on which is wound a helical wire grid 45, the upper ends of the rods 44 being in contact with the insulating block 42. Since the basic material on the cathode 30 is liable to be projected toward the insulating block 42 or toward the glass stem in which the leading-in wires are sealed, it is preferable to apply a coating of the amphoteric substance to the surface of the insulating block facing the cathode so that any material thrown on the insulating block will be converted to an inactive compound which will not affect the insulating path between the several supports held in the block. Likewise, the material thrown off the cathode and projected downwardly through the open end of the anode 39 which may be deposited on the mass of material 38 held in the trough 36 and will be converted to a stable non-conducting compound which will not affect the insulating path between the closely spaced leading-in wires embedded in the stem.

In the devices heretofore described, the leading-in wires for the electrodes are closely spaced in a glass stem and are exposed to the basic material thrown off the cathode which is liable to be deposited in the space between the leading-in wires to form a conducting path. In the device shown in Fig. 5 the electrodes are formed into a unitary structure and this structure is supported from the glass stem 46 by a metallic collar, the electrode supports being affixed to insulating plates extending across opposite ends of the electrode structure. In this arrangement the flattened cylindrical anode 47 carries block 48 at one end and a second insulating block 49 at the opposite end. A wire grid 50 wound on upright supports affixed to the insulating blocks 48 and 49 is uniformly spaced within the anode 47. A double M-shaped cathode in the form of a filament is supported within the grid and anode by a plurality of resiliently mounted hooks 51 extending from the insulator 48 and is also supported by a plurality of upright wires extending from the block 49. The whole unit is supported from the glass stem by angular arms 52 extending from opposite sides of the anode 47, the arms being attached to a metallic collar 53 which embraces the stem 46. In this arrangement the insulating block or plate 49 forms a shield across the leading-in wires 54 for the filament so that these wires are not liable to be shorted by active material thrown off the cathode and deposited on the glass stem. Similarly, the grid is connected to a leading-in wire 55 which is sealed through the stem below the collar 53 while the anode is connected to an external circuit by a leading-in wire 56 sealed through the opposite side of the stem 46.

Figure 5:
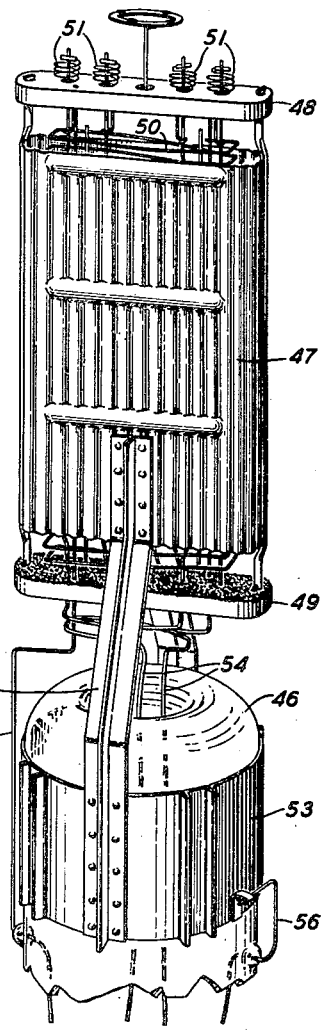
Fig. 5 is a perspective view of another electrode assembly in which the various electrodes are grouped together in a unit and supported from a glass stem, the enclosing vessel of the device being removed to simplify the illustration.

In the above described device the liability of shorting the supports of the electrodes occurs on the faces of the insulating blocks or plates 48 and 49 exposed to the electrode surfaces. Therefore, it is necessary to apply the amphoteric substance to the surface of the insulating plate 49 as shown in Fig. 5 to insure an adequate insulation path between the closely spaced supporting wires affixed in this block. Similarly, a coating should be applied to the lower surface of insulating plate 48 the same as shown in Fig. 2 to insure the maintenance of an adequate insulation path between the adjacent supports held in this block.

While the drawings show a number of examples for the application of this invention to specific structures of electric discharge devices, it is to be understood that the invention is also applicable to electrode structures in which the cathode is of the equi-potential type in which the emitting material is deposited on, or combined with a metallic surface indirectly brought to emitting temperature by a separate heater element. It is also to be understood that various other modifications may be made in the structural application of the invention without departing from the scope thereof as defined in the appended claims.

What is claimed is:

1. An electric discharge device comprising an enclosing vessel, a plurality of electrodes including a heatable cathode having a coating of an alkaline earth oxide within said vessel, supports for said electrodes, a common insulating member to which said supports are secured, and a layer of material of the group consisting of nickel, chromium, aluminum and manganese on the surface of said insulating member exposed to said electrodes.

2. An electric discharge device comprising an enclosing vessel having a stem, a highly active electron emitting heatable cathode having an alkaline earth oxide coating beyond said stem, an anode associated with said cathode, supports for said cathode and anode projecting from said stem, a coating on said stem adjacent said supports of a material of the group consisting of nickel, chromium, aluminum and manganese.

3. In combination, a discharge device having a heatable cathode coated with an alkaline earth emissive substance, a stem supporting leading-in wires for said cathode and another electrode, and a deposit of a non-conducting oxide of the group consisting of nickel, chromium, aluminum and manganese on said stem surrounding said leading-in wires to combine with said emissive substance to form an inactive, stable, insulating compound.

4. An electric discharge device comprising an enclosing vessel having a stem, leading-in wires sealed in said stem, said stem having an open cavity adjacent said sealed leading-in wires, a cathode having a highly active coating as a source of electrons, said cathode being connected to two of said leading-in wires, an anode associated with said cathode and connected to other of said leading-in wires, and a mass of an amphoteric oxide of the group consisting of nickel, chromium, aluminum and manganese surrounding said leading-in wires in said cavity.

5. An electric discharge device comprising an enclosing vessel having a stem, leading-in wires sealed in said stem, said stem having a hollow trough surrounding said leading-in wires, a cathode coated with basic emissive material and another electrode attached to said leading-in wires beyond said stem, and a mass of nickel oxide filling said trough, whereby basic material from said cathode deposited on said mass is capable of being converted to nickelites.

6. An electric discharge device comprising an enclosing vessel having a stem, leading-in wires sealed in said stem, a heatable cathode coated with an alkaline earth material connected to two of said leading-in wires, an anode associated with said cathode and connected to another of said leading-in wires, and a coating of a non-conducting metallic oxide of the group consisting of nickel, chromium, aluminum and manganese on said stem for combining with active material thrown off said cathode to form an inactive non-conducting substance whereby leakage between said leading-in wires on said stem is prevented.

7. An electric discharge device comprising an enclosing vessel having a stem, leading-in wires sealed in said stem, a heatable cathode coated with an alkaline earth oxide attached to said leading-in wires, an anode associated with said cathode and connected to another of said leading-in wires, an insulating member beyond said stem for spacing said cathode and anode, and a coating of aluminum oxide on said stem and member for combining with the active material thrown off said cathode to form a stable non-conducting compound on said stem and member.

FRANK E. WARD.